United States Patent
Yamamoto

(10) Patent No.: US 6,212,293 B1
(45) Date of Patent: Apr. 3, 2001

(54) IMAGE READING DEVICE

(75) Inventor: Yasuhiro Yamamoto, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/103,815

(22) Filed: Jun. 24, 1998

(30) Foreign Application Priority Data

Jun. 25, 1997 (JP) .................................................. 9-184477

(51) Int. Cl.⁷ .......................................................... G06K 9/00
(52) U.S. Cl. ........................................... 382/168; 382/132
(58) Field of Search .................................... 382/168, 132, 382/274, 318, 319; 358/160, 162, 169

(56) References Cited

U.S. PATENT DOCUMENTS

| | | | |
|---|---|---|---|
| 4,187,519 | * 2/1980 | Vitols et al. | 358/169 |
| 5,586,327 | * 12/1996 | Bealkowski et al. | 395/652 |
| 5,946,407 | * 8/1999 | Bamberger et al. | 382/132 |

* cited by examiner

*Primary Examiner*—Bijan Tadayon
*Assistant Examiner*—Seyed H. Azarian
(74) *Attorney, Agent, or Firm*—Greenblum & Bernstein, P.L.C.

(57) ABSTRACT

The image reading device has a pixel data reading processor, in which pixel data forming an image is read, and a histogram generating processor, in which a histogram representing a distribution of the pixel data is generated. The histogram is utilized when determining an optimum exposure time, for example. In the generation of the histogram by the histogram generating processor, not all of the pixel data are used. Namely, pixel data, from the maximum value through a first boundary value, and pixel data, from a second boundary value through the minimum value, are used. Since the pixel data, from the first boundary value through the second boundary value, are not utilized in generating the histogram, the capacity of the memory, in which the histogram is stored, can be reduced.

10 Claims, 15 Drawing Sheets

```
LUT[0]    =0
  .        .
  .        .
  .        .
LUT[L1]   =10
  .        .
  .        .
  .        .
LUT[L2]   =245
  .        .
  .        .
  .        .
LUT[1023] =255
```

IMAGE READING DEVICE

BACKGROUND OF THE INVENTION

1. Field of the Invention

The present invention relates to an image reading device in which an image recorded in a film, for example, is irradiated with a light beam and the image is read using a line sensor.

2. Description of the Related Art

Conventionally, in the image reading device, an exposure measurement is performed prior to a pre-scanning operation and a regular scanning operation, by which image data are sensed and output to a personal computer, so that an optimum exposure time, for which electric charges are accumulated in the line sensor, is calculated. Namely, in the exposure measurement, a scanning operation is carried out with a pitch, which is coarser than that of the regular scanning operation, and image data, sensed by exposing the line sensor with a relatively abort exposure time, is analyzed so that the optimum exposure time is obtained. The analysis of the image data is carried out based on a histogram representing a frequency distribution of pixel values of the image data obtained by the line sensor.

The histogram is stored in a memory. Namely, in the memory, the frequency of occurrence, i.e. the number of pixels having an identical pixel value (an identical luminance value, for example), is stored in an address corresponding to the pixel value. In the calculation of the optimum exposure time, however, as the entire range of data forming the histogram is not utilized, only the data included in a predetermined range are required.

SUMMARY OF THE INVENTION

Therefore, an object of the present invention is to reduce the amount of histogram-formation data, which should be stored in the memory, thereby allowing the capacity of the memory to be decreased.

According to the present invention, there is provided an image reading device comprising a pixel data reading processor and a histogram generating processor.

The pixel data reading processor reads the pixel data which forms an image, where each of the pixel data has a value included in a first range. The histogram generating processor generates a histogram representing a distribution of the pixel data having values included only in a second range which is a part of the first range.

Further, according to the present invention, there is provided an image reading device comprising a pixel data reading processor and a histogram generating processor.

The pixel data reading processor reads the pixel data which forms an image. The histogram generating processor generates a histogram representing a distribution of only a part of the pixel data read by the pixel data reading processor.

BRIEF DESCRIPTION OF THE DRAWINGS

The present invention will be better understood from the description of the preferred embodiment of the invention set forth below, together with the accompanying drawings, in which.

DESCRIPTION OF THE PREFERRED EMBODIMENTS

Figure 1:
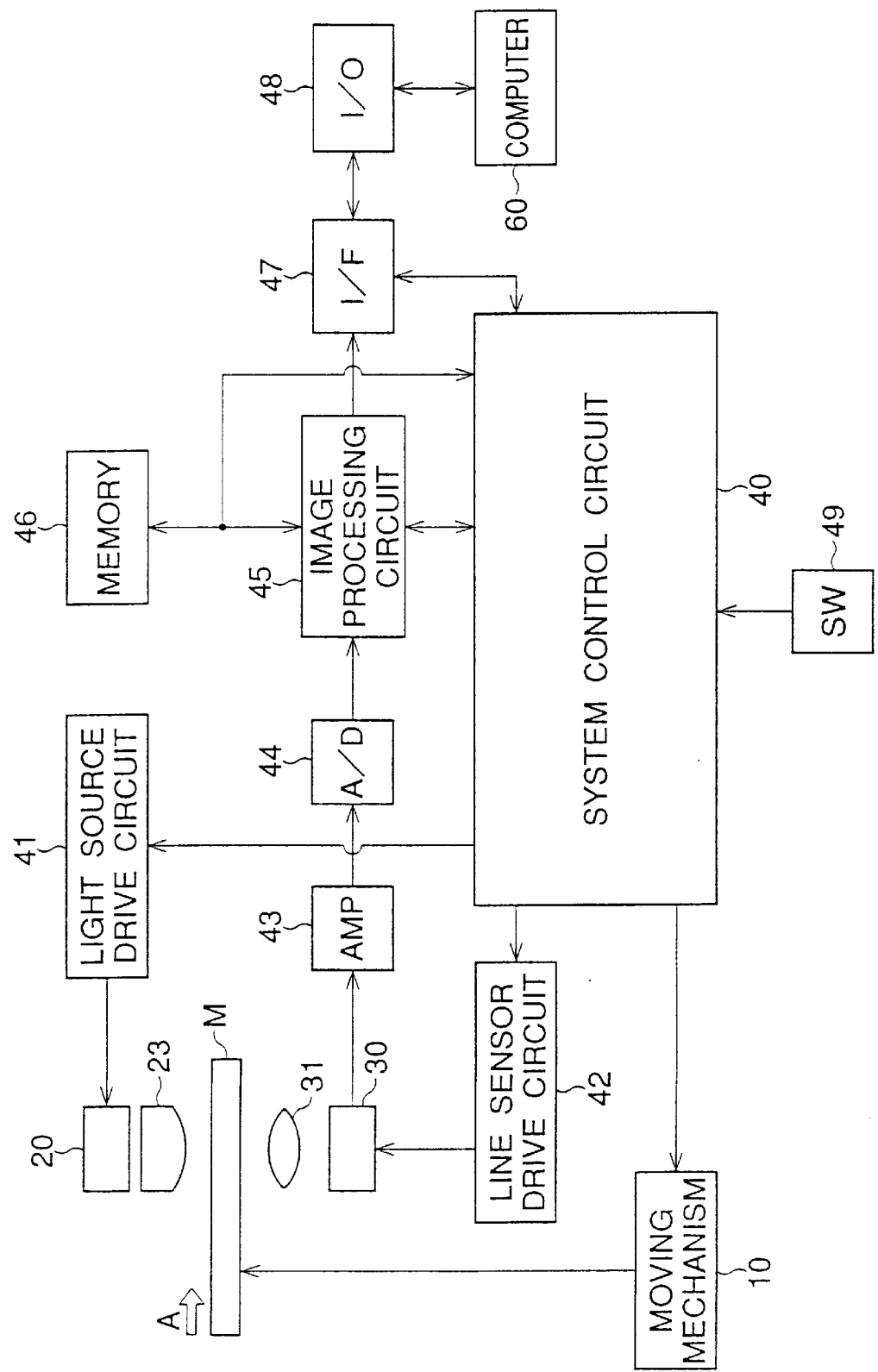
FIG. 1 is a block diagram showing an image reading device of an embodiment of the present invention.

The present invention will be described below with reference to an embodiment shown in the drawings.

FIG. 1 shows an electrical structure of an image reading device of an embodiment of the present invention.

A read object M, handled by this image reading device, is a transparent negative film on which a color image has been recorded. The read object M is intermittently moved, by a moving mechanism 10, in a direction shown by an arrow A.

A light source 20 and a cylindrical lens 23, provided below the light source 20, are disposed above a path along which the read object M is moved. A line sensor 30 and a forming lens 31, provided above the line sensor 30, are disposed under the path. The light source 20 is connected to a light source drive circuit 41, so that the light source 20 can be turned ON and OFF. The line sensor 30 in connected to a line sensor drive circuit 42, so that the color image can be read by the line sensor 30. The moving mechanism 10, the light source drive circuit 42 and the line sensor drive circuit 42 are controlled in accordance with a command signal outputted by a system control circuit 40.

The line sensor 30 is provided with a plurality of photo-diodes, which are aligned rectilinearly, whereby an electric signal, corresponding to the amount of light received by a photo-diode, is generated in each of the photo-diodes. The electric signal (i.e. the image data), read through the line sensor 30, is amplified by an amplifier 43 and is converted to a digital signal by an A/D converter 44. The digital image data is subjected to a shading correction, in an image processing circuit 45, and is then stored in a memory 46.

The pixel data, subsequent to being read from the memory 46, in subjected to predetermined correction processes, such as a color correction and a gamma correction. Then, the image data is converted to a signal, which conforms to a predetermined format, by an interface circuit 47, and is outputted to an external computer 60 through an input/output terminal 48. Thus, the image reading device and the external computer 60 can communicate with each other through the interface circuit 47 and the input/output terminal 48, so that various control operations can be performed in the image reading device and the external computer 60.

The image processing circuit 45 and the interface circuit 47 are controlled by the system control circuit 40.

In this embodiment, although all of the operations can be controlled by the external computer 60, a switch 49 may be connected to the system control circuit 40, so that various operations can be directly performed, such an reading the image recorded on the read object M, for example.

Figure 2:
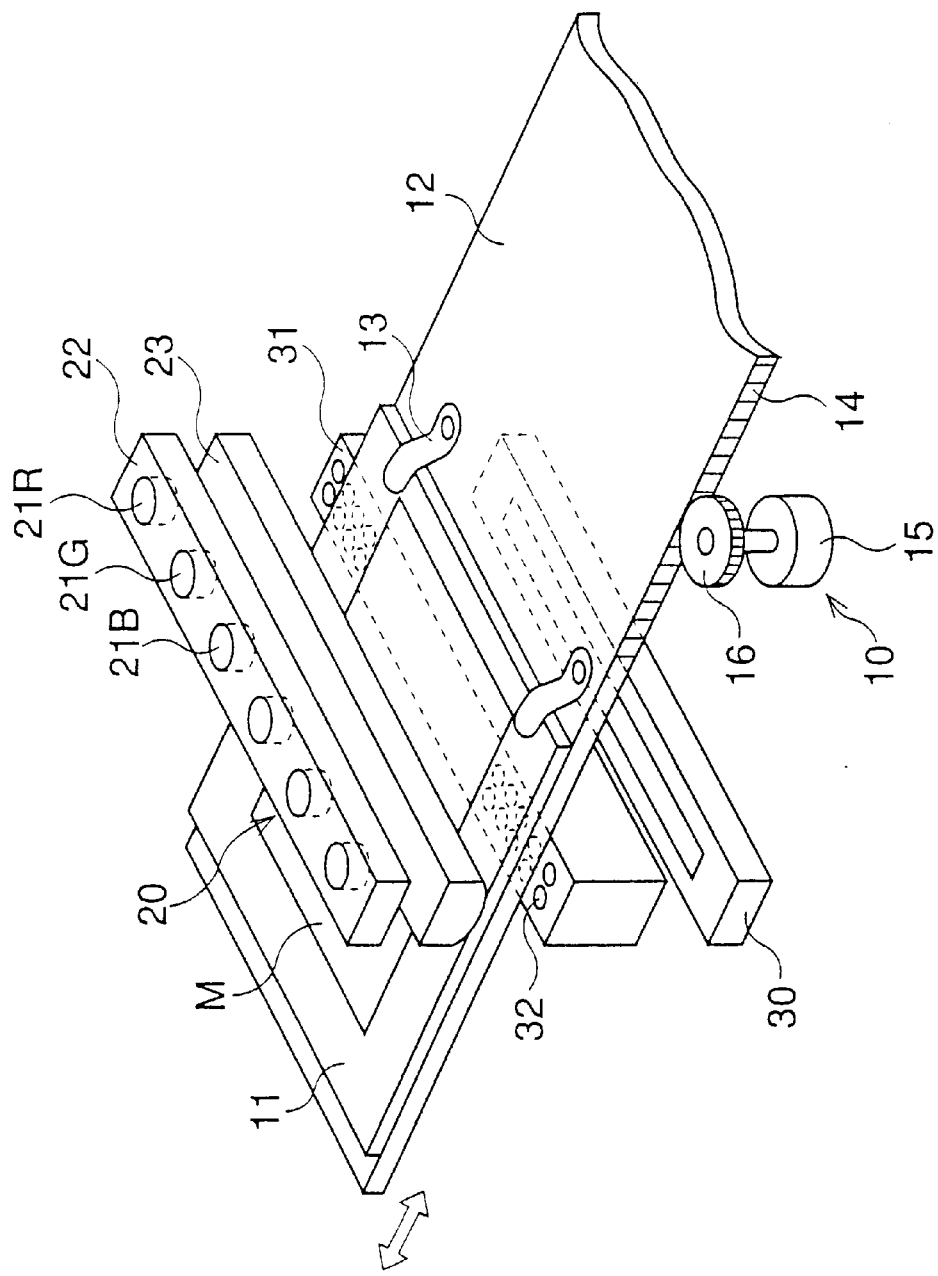
FIG. 2 is a perspective view showing a moving mechanism, a light source and a line sensor, when a transparent film is used.

FIG. 2 shows the moving mechanism 10, the light source 20 and the line sensor 30. The read object M is supported by a frame 11, which is fixed on a plate stage 12 by a fastener 13. An opening (not shown) is formed in the stage 12 at a position corresponding to the read object M, so that a light beam radiated onto the read object M can pass through the read object M. A rack 14 is formed on a side surface of the stage 12. A pinion 16 fixed on an output shaft of a feeding motor 15 is meshed with the rack 14. The feeding motor 15, which is a stepping motors for example, is driven under control of the system control circuit 40, so that a position and a moving speed of the read object M are controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, further light-emitting diodes may be provided. The light-emitting diodes 21R, 21G and 21B, supported by a slender support member 22, which extends in a breadth direction of the stage 12, are arranged in this order uniformly along the support member 22. The cylindrical lens 23, positioned between the support member 22 and the stage 12, is extended in parallel with the support member 22. Namely, light emitted by the light-emitting diodes 21R, 21G and 21B is condensed in a direction in which the stage 12 is moved, by the cylindrical lens 23, so that a line-shaped light beam is radiated onto the read object M.

The line sensor 30 is positioned under the light source 20, leaving a space therebetween, such that the stage 12 can be interposed between the light source 20 and the line sensor 30. The line sensor 30, the light source 20 and the cylindrical lens 23 are parallel to each other. Namely, the line sensor 30 extends in a direction approximately perpendicular to a direction in which the read object M is moved. The forming lens 31 is provided between the line sensor 30 and the stage 12. The forming lens 31, composed of a rod lens array 32, extends parallel to the line sensor 30. Accordingly, when a light beam is emitted onto the read object M, by the light source 20, the image recorded in the read object M is formed on the light receiving surface of the line sensor 30, through the forming lens 31.

Figure 3:
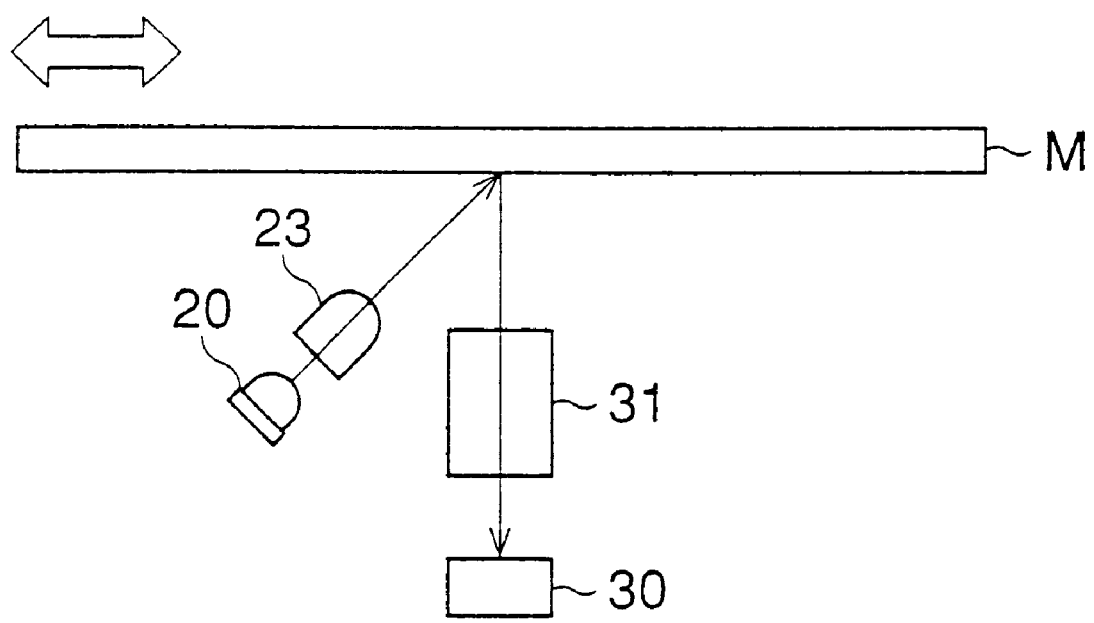
FIG. 3 is a view showing a structure, including a light source and a line sensor, used for reading an image recorded on a read object from which a light beam is reflected.

FIG. 3 shows an alternative structure able to be utilized in this embodiment, that includes the light source 20 and the line sensor 30, used for reading an image recorded on a read object M from which a light beam is reflected. In this structure, the light source 20, the cylindrical lens 23, the line sensor 30 and the forming lens 31 are disposed under the read object M. Namely, a light beam outputted from the light source 20 is radiated onto the lower surface of the read object M, so that the light beam reflected by the read object M enters the line sensor 30 through the forming lens 31.

Figure 4:
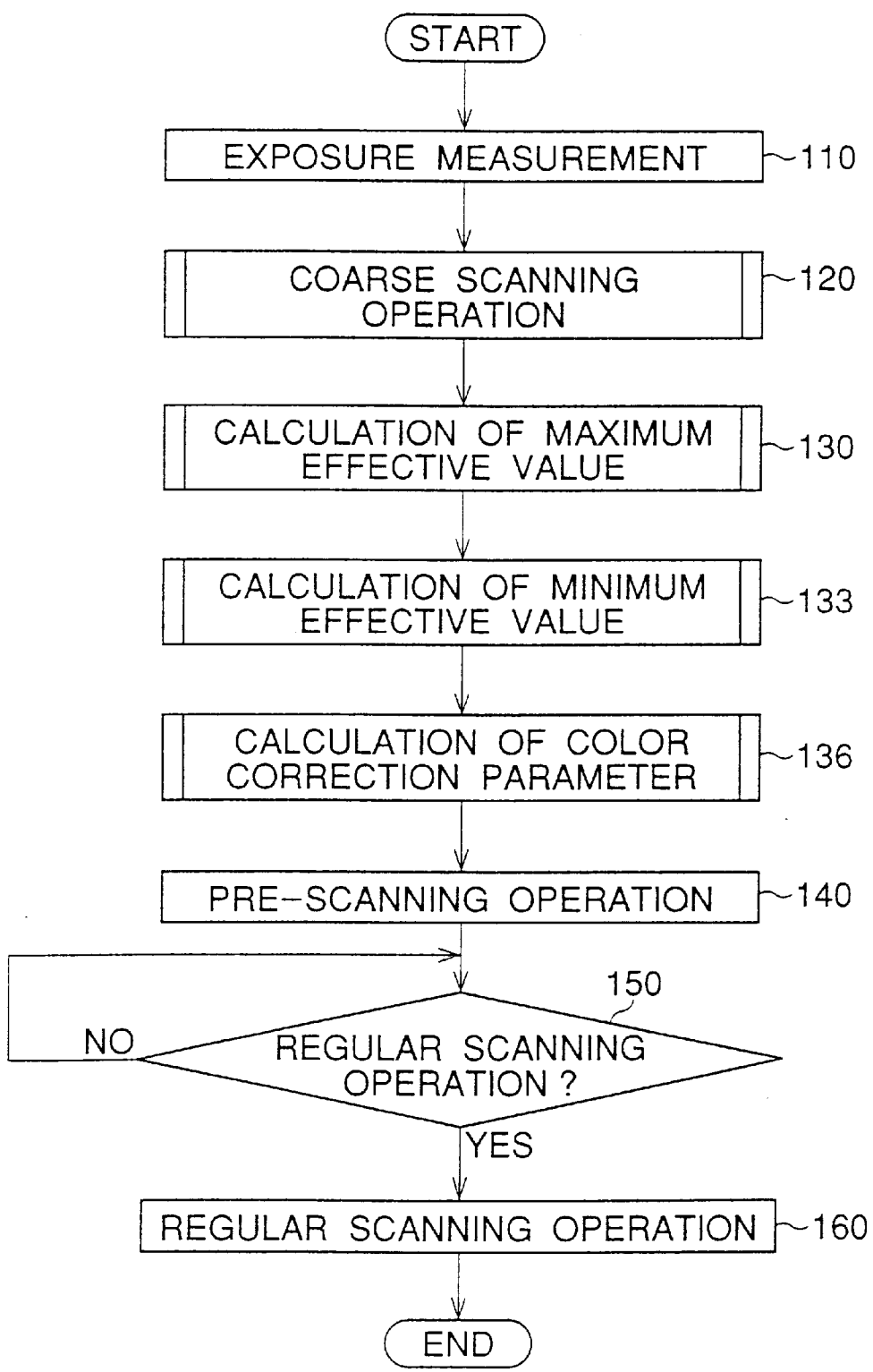
FIG. 4 is a flowchart of an image reading routine.

FIG. 4 is a flowchart of an image reading routine executed in the image reading device.

In Step 110, an exposure measurement is performed. Namely, while the light source 20 is turned ON, the road object M is intermittently moved, via the moving mechanism 10, with a pitch coarser than that of a regular scanning operation which is executed in Step 160. During the stationary intervals (i.e. while the stage 12 and the read object M are stopped), the line sensor 30 is exposed for a predetermined exposure time. Thus, image data corresponding to the image recorded on the read object M are sensed by the line sensor 30. In the exposure measurement, the light source 20 is controlled in such a manner that the light-emitting diodes 21R, 21G and 21B are illuminated in a predetermined order every time the stage 12 is stopped, so that R, G and B image data are obtained. Then, by a method well known and thus not described herein in detail, regarding each of the R, G and B images, an optimum exposure time, i.e. an exposure time by which an optimum output of the line sensor is obtained, is calculated.

Then, in Steps 120 through 136, a process, by which color correction parameters are calculated, is performed. The image signal read from the read object M is then subjected to a negative/positive conversion. At this time, since the ground color of the read object M is a chromatic color, the color correction should be performed. The color correction parameters are used for performing the color correction when the image signal is subjected to the negative/positive conversion.

Figure 5:
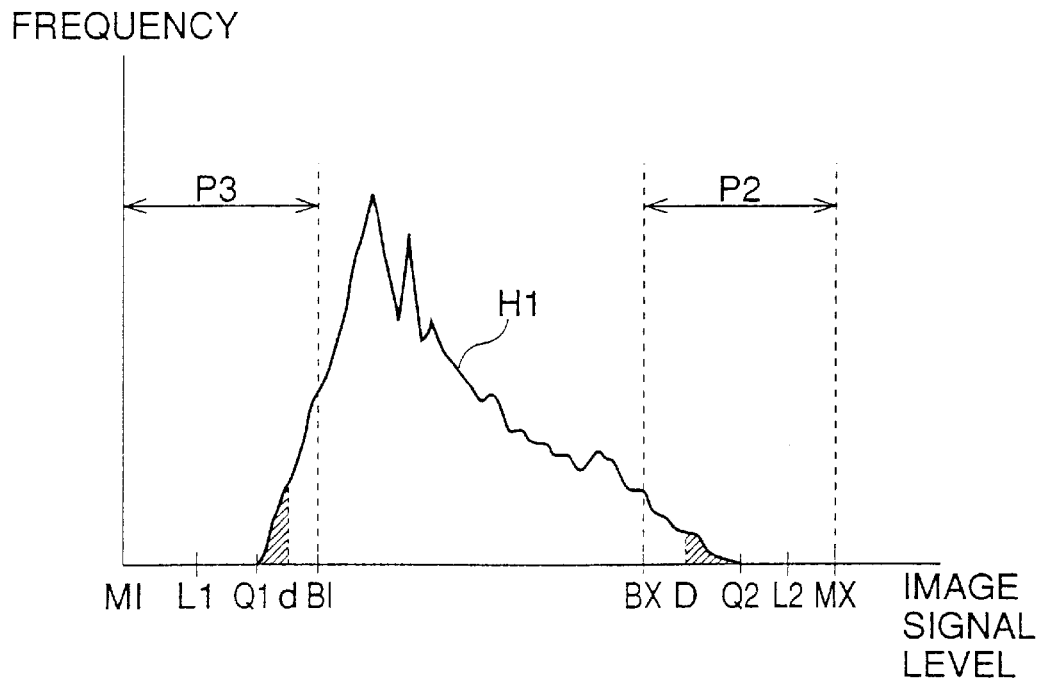
FIG. 5 is a representative histogram representing a distribution of pixel values obtained by a line sensor.

In Step 120, a coarse scanning operation is carried out. The coarse scanning operation is performed while the light source 20 is turned ON, similarly to the exposure measurement. In the coarse scanning operation, while the read object M is intermittently moved with a pitch coarser than the regular scanning operation, the line sensor 30 is exposed for the optimum exposure time, so that pixel data of one frame's worth are detected. Then, based on the pixel data, a histogram representing the distribution of pixel values, representatively shown by histogram H1 in FIG. 5, is obtained for each of the R, G and B components. Namely, the abscissa of FIG. 5 indicates the pixel value (i.e. pixel signal level) and the ordinate indicates a frequency of occurrence of the pixel value.

In Step 130, regarding the representative histogram H1, generally corresponding to the histograms generated for each of the R, G and B components, a maximum effective value "D", which is less than the maximum pixel value Q2 by a predetermined amount, is obtained. In Step 133, again with respect to the representative histogram H1, a minimum effective value "d", which is greater than the minimum pixel value Q1 by a predetermined amount, is obtained. Then, in Step 136, the color correction parameters are calculated using the maximum effective value "D" and the minimum effective value "d". Note, the obtaining of the maximum effective value "D" and the minimum effective value "d" will be described later.

In Step 140, a pre-scanning operation is performed. The reading pitch of the pre-scanning operation is finer than that of the coarse scanning operation, but coarser than that of the regular scanning operation. In the pre-scanning operation, for each of the R, G and B components, the pixel data are detected by the line sensor 30 with the optimum exposure time. The pixel data are then converted into digital pixel data by the A/D convertor 44.

The digital pixel data of each of the color components are subjected to the color correction and the negative/positive conversion, using the color correction parameters which are obtained in Step 136, in the image processing circuit 45, so that normalized digital pixel data are obtained. The normalized digital pixel data are subjected to a gamma correction, and then outputted to a display device of the computer 60, which is provided outside the image reading device, through the input/output terminal 48, so that a color image is indicated on a surface of the display device of the computer 60.

In Step 150, it is determined whether the regular scanning operation is to be started. The user can determine whether the regular scanning operation is to be started by observing the image indicated on the surface of the display device of the computer 60. By clicking a button on a mouse, incorporated as part of the computer 60, for example, for starting the regular scanning operation, the process goes from Step 150 to Step 160, in which the regular scanning operation is performed. While the button on the mouse is not clicked, i.e. while the regular scanning operation is not to be performed, Step 150 is repeatedly executed.

In Step 160, the regular scanning operation is performed, in which the image recorded on the read object M is read with a predetermined fine pitch, so that the pixel data are detected and converted into digital pixel data, similarly to the pre-scanning operation. The digital pixel data are subjected to the color correction and the negative/positive conversion, so that the pixel data are converted into the normalized digital pixel data. By referring to a look-up table (LUT), which is stored in the memory 46, for example, the normalized digital pixel data are converted into preset values so that the normalized digital pixel data are subjected to a gamma correction. The data, which have been subjected to the gamma correction, are outputted to the display device of the computer 60 through the interface circuit 47 and the input/output terminal 48, and this program ends.

The color correction and the negative/positive conversion are described below. FIG. 5 shows the representative histogram H1 representing a distribution of values (i.e. pixel values) of the pixel data which may be obtained through the line sensor 30 and the A/D convertor 44 during a coarse scanning operation (Step 120, FIG. 4), a pre-scanning operation (Step 140) or a regular scanning operation (Step 160). In actuality, due to the embodiment, only the histograms corresponding to regions P2 and P3 of representative histogram H1 are obtained for each of the R, G and B components in the coarse scanning operation, these histogram data then being utilized in obtaining the color correction parameters.

Figure 6:
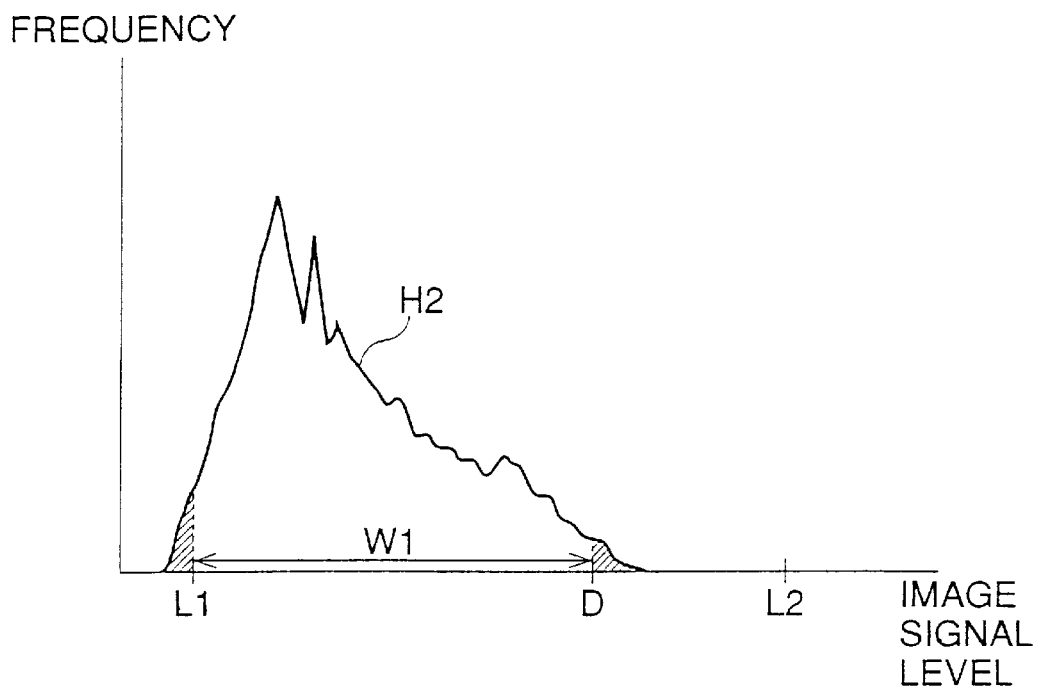
FIG. 6 is a hypothetical histogram obtained by performing an offset subtraction to the histogram shown in FIG. 5.
Figure 7:
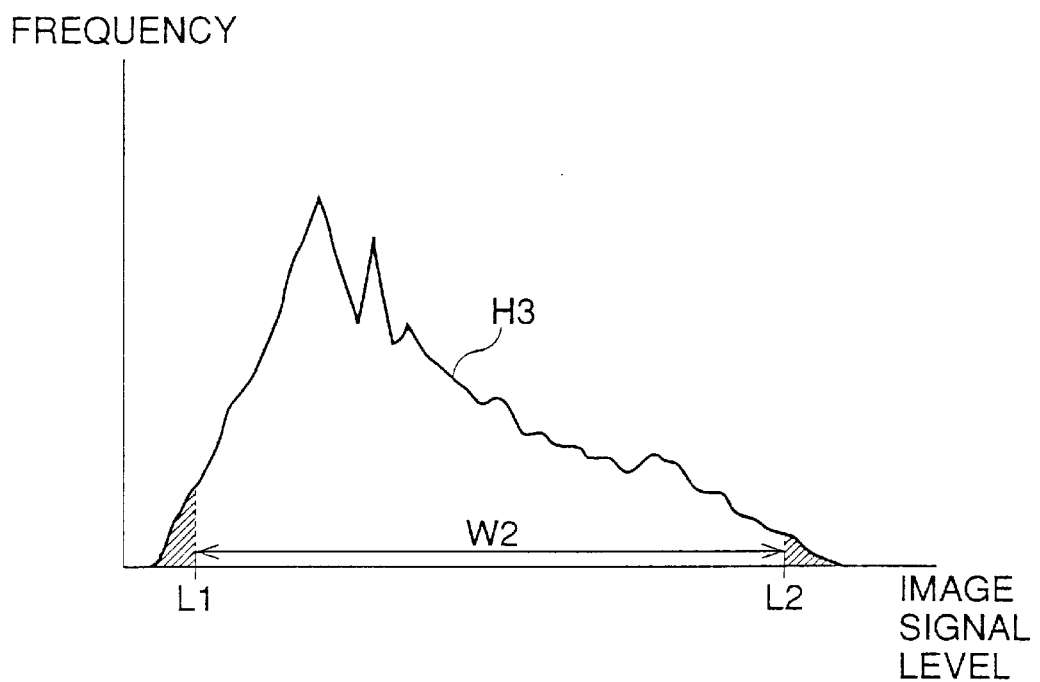
FIG. 7 is a hypothetical histogram obtained by multiplying the data of FIG. 6 by the coefficient (L2−L1)/(D−d)
Figure 8:
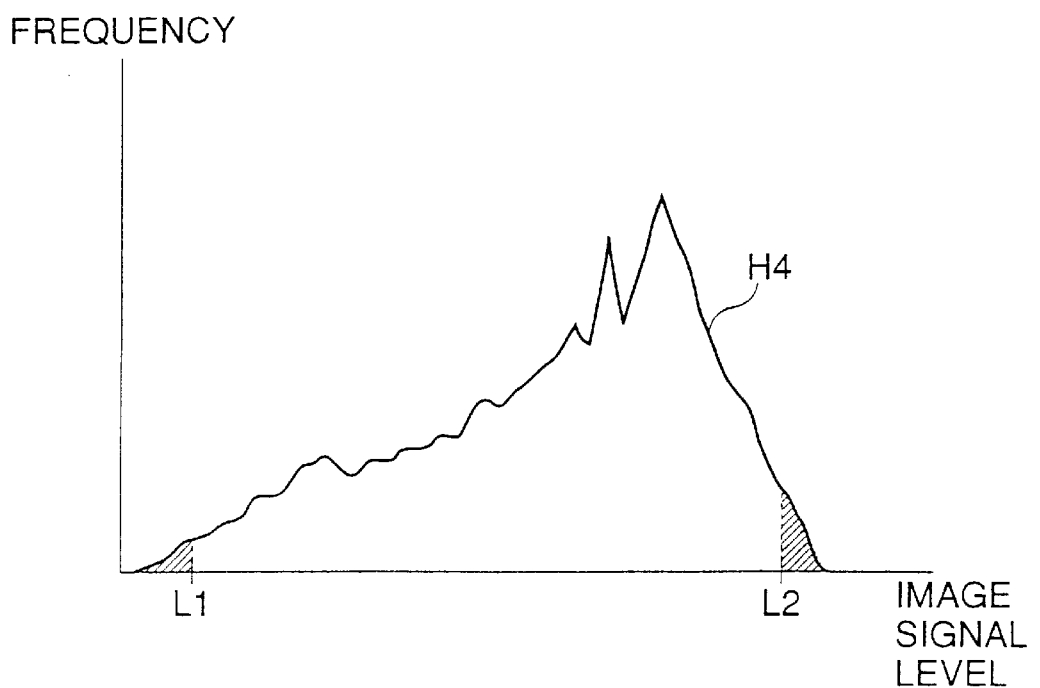
FIG. 8 is a hypothetical histogram of normalized data derived from the data of FIG. 7.

The digital pixel data of one frame-image are subjected to the color correction and the negative/positive conversion according to formula (1) below, so that the digital pixel data are converted to the normalized digital pixel data ND, as described with reference to hypothetical histograms H2, H3 and H4 of FIGS. 6, 7 and 8. An example of a hypothetical histogram representing a distribution of the signal levels of the normalized digital pixel data, for each of the color components R, G and B, is shown in FIG. 8. With reference to FIGS. 5 through 8, the implications of applying formula (1) are outlined:

$$ND = L2 - X2 + L1 \quad (1)$$
$$= L2 - (L1 + (ID - d) \times (L2 - L1)/(D - d)) + L1$$
$$= L2 - (ID - d) \times (L2 - L1)/(D - d)$$

In formula (1), "ID" is input data, "D" implies the maximum effective data, and "d" implies the minimum effective data. "L1" and "L2" are a lower standard value and an upper standard value of the LUT for performing various correction processes, including a gamma correction. Namely, the lower standard value L1 in the minimum value of the pixel values, which can be referred to in the LUT, and the upper standard value L2 is the maximum value of the pixel values, which can be referred to in the LUT.

Therefore, in detail, each digital pixel value (input value) of the one frame-image, stored in the memory 46, are subjected to an offset subtraction calculation according to formula (2):

$$X1 = (ID - d) + L1 \quad (2)$$

Namely, due to the term (ID-d), the minimum effective value "d" is subtracted from the digital pixel value "ID", so that the histogram H1, being hypothetically generated in the pre-scanning operation and the regular scanning operation to represent the range of digital pixel data of one frame-image, is shifted leftward in FIG. 5. By adding the lower standard value L1 to the shifted digital pixel value, an offset subtraction digital pixel value X1, and thus a hypothetical histogram H2 shown in FIG. 6, is obtained.

The substantial distribution breadth W1 of the histogram H2 ranges from L1 through D, and is converted into the distribution breadth W2 according to formula (3):

$$X2 = L1 + (X1 - L1) \times (L2 - L1)/(D - d) \quad (3)$$
$$= L1 + ((ID - d) + L1 - L1) \times (L2 - L1)/(D - d))$$
$$= L1 + (ID - d) \times (L2 - L1)/(D - d)$$

Namely, by multiplying a value (X1–L1), which is obtained by subtracting the offset value L1 from the offset subtraction digital pixel value X1 of the histogram H2 of FIG. 6, by the coefficient (L2–L1)/(D–d), and then by adding the lower standard value L1, the distribution breadth W1 is expanded to the distribution breadth W2, once each offset subtraction digital pixel value X1 has been converted, a hypothetical histogram H3 can be obtained, as shown in FIG. 7.

Then, by subtracting "X2" of formula (3) from the upper standard value L2 and adding the lower standard value L1 thereto (see formula (1)), the histogram H3 is left-right reversed. Namely, the digital pixel data of the one frame-image are subjected to the negative/positive conversion, so that a hypothetical histogram H4, corresponding to normalized digital pixel data, shown in FIG. 8 is obtained.

Thus, each R, G and B component digital pixel data is converted in such a manner that a distribution range between the minimum effective value "d" and the maximum effective value "D" is changed to a distribution range between the upper standard value "L2" and the lower standard value "L1", so that the color balance of each of the color components can be adjusted. Thus, the image, read by the line sensor 30, can be reproduced with a natural color, which is the original color of the image. Namely, by adjusting the distribution range of each of the color components, the pixel data are color-adjusted.

Note that, in formula (1), the shift amount "d" (i.e. the minimum effective value) and the coefficient (L2−L1)/(D−d) are the color correction parameters, which are obtained separately for each of the R, G and B components.

Figures 9, 10:
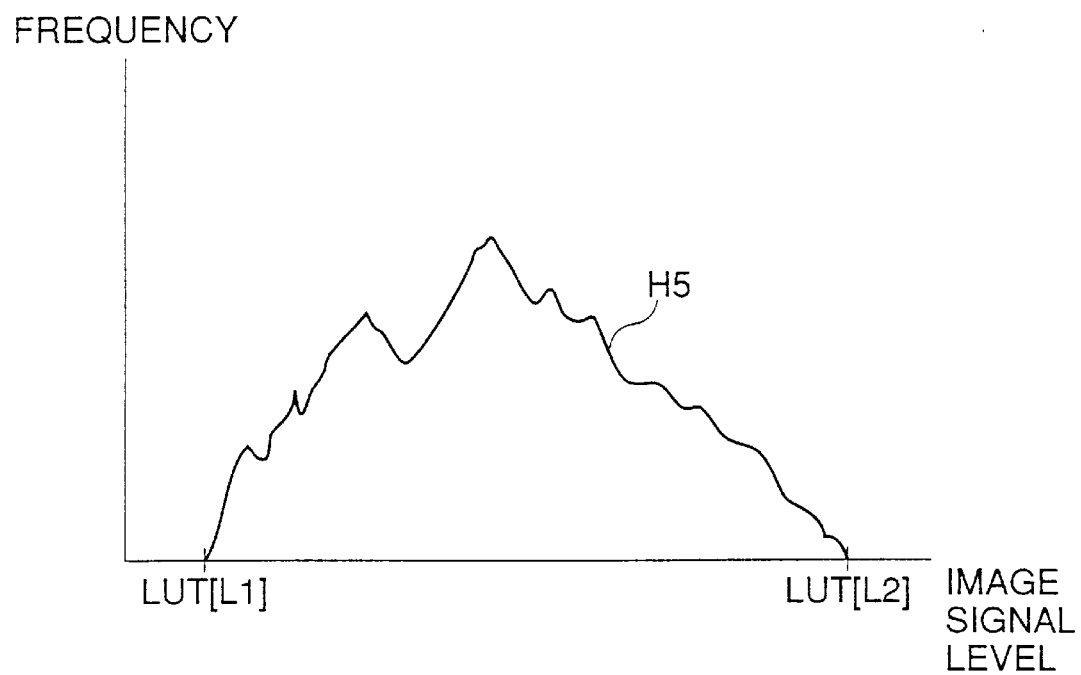
FIG. 9 is a hypothetical histogram corresponding to pixel data read from the read object, which have been subjected to a gamma correction.
FIG. 10 is a view showing an example of a look-up table.

The digital pixel data of the one frame-image previously stored in the memory 46, after being subjected to the color correction and the negative/positive conversion, thereby producing normalized digital pixel data, are subjected to a process such as a gamma correction by referring to the LUT, as described above, and transmitted to the display device of the computer 60, so that a color image is indicated on the surface of the display device. FIG. 9 shows a hypothetical histogram H5 corresponding to the processed pixel data of one frame-image, which have been subjected to the gamma correction. As shown in this drawing, the histogram H5 is distributed in a range from LUT[L1] through LUT[L2]. Note that LUT[L1] and LUT[L2] are values corresponding to the lower standard value L1 and tire upper standard value L2, respectively. FIG. 10 shows an example of the LUT.

Figure 11:
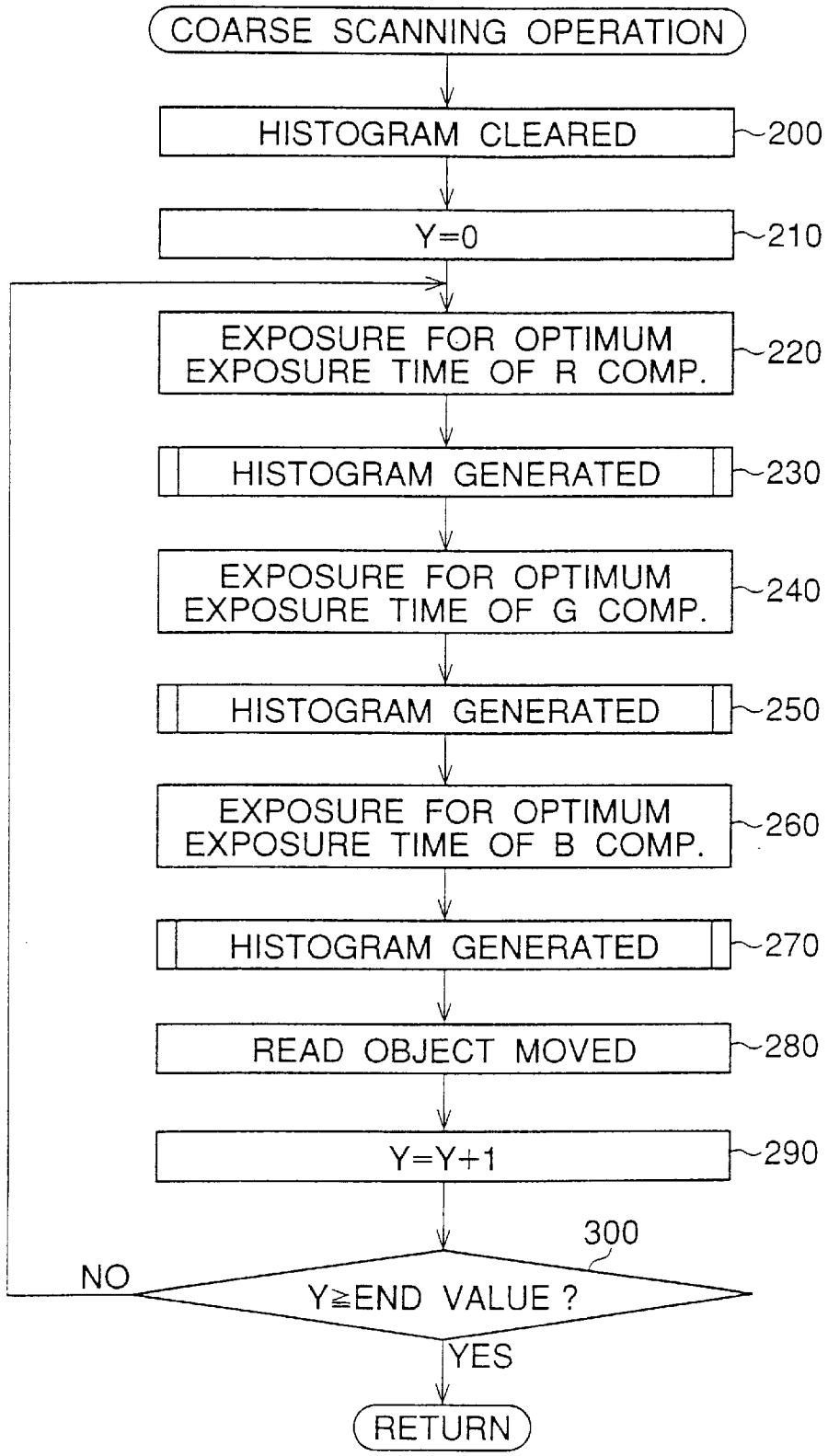
FIG. 11 is a flowchart of a subroutine for executing a coarse scanning operation.

FIG. 11 is a flowchart of a subroutine of a coarse scanning operation executed in Step 120 of FIG. 4.

In Step 200, histogram data, which are stored in the memory 46, are cleared. In Step 210, the stage 12 is moved, so that an edge portion of the read object M is set to an initial position corresponding to the light source 20, and an initial value of a parameter Y corresponding to the position of the read object M is set to 0.

In Step 220, the light-emitting diodes 21R of the light source 20 are turned ON, so that the read object M is illuminated. The line sensor 30 is exposed for the optimum exposure time for the R component, by a red light beam passing through the read object M, whereby a single line of red pixel data are detected. The single line of red pixel data are converted to a single line of digital red pixel data by the A/D convertor 44 and stored in the memory 46.

In Step 230, a subroutine (see FIG. 13) for generating a red histogram, corresponding to the regions P2 and P3 of the histogram H1 of FIG. 5, is executed. Data for forming the histogram H1 is generated based on the single line of digital red pixel data, obtained in Step 220 and stored in the memory 46.

In Steps 240 through 270, similarly to Steps 220 and 230, exposures and histogram generations corresponding to the G and B components are performed. Namely, in Step 240, the light-emitting diodes 21G of the light source 20 are turned ON, so that, by exposure for the optimum exposure time to the G component, a single line of green pixel data are detected. In Step 250, a green histogram, corresponding to the histogram H1 of FIG. 5, is generated for a single line of digital green pixel data. In Step 260, the light-emitting diodes 21B of the light source 20 are turned ON, so that, by exposure for the optimum exposure time to the B component, a single line of blue pixel data are detected. In Step 270, a blue histogram, corresponding to the histogram H1 of FIG. 5, is generated for a single line of digital blue pixel data.

In Step 280, the stage 12 and the read object M are moved by one pitch, and in Step 290, the parameter Y is increased by one. In Step 300, it is determined whether the parameter Y is greater than or equal to the end value (i.e. the number of scanning lines of the coarse scanning operation). When the parameter Y is less than the end value, the processes from Steps 220 through 300 are executed again, so that the histograms, corresponding to the regions P2 and P3 of the histogram H1 of FIG. 5, are continued to be generated for the next line of each of the R, G and B components. When it is determined in Step 300 that the parameter Y is greater than or equal to the end value, the subroutine of the coarse scanning operation ends since each of the histograms, for the R, G and B components, corresponding to the histogram H1 of FIG. 5, of one frame image have been completed.

In this embodiment, in a process in which the histogram, corresponding to the regions P2 and P3 of the histogram H1 of FIG. 5, is generated, not all of the pixel data, obtained for a color component of one image and included in a first range, are used, but pixel data, included only in a second range, which is a part of the first range, are used. The second range has an upper region P2, which is from the maximum value MX (see FIG. 5), i.e. 1023 when 10 bits data used, of the first range to a first boundary value BX (see FIG. 5), which is lower than the maximum value MX, and a lower region P3, which is from the minimum value MI (see FIG. 5), i.e. 0, of the first range to a second boundary value BI (see FIG. 5), which is lower than the first boundary value BX and higher than the minimum value MI. The first and second boundary values BX and BI are present values. Namely, the first boundary value BX is statistically determined so as to become smaller than the maximum effective value "D", and the second boundary value BI is statistically determined so as to become greater than the minimum effective value "d".

Figure 12:
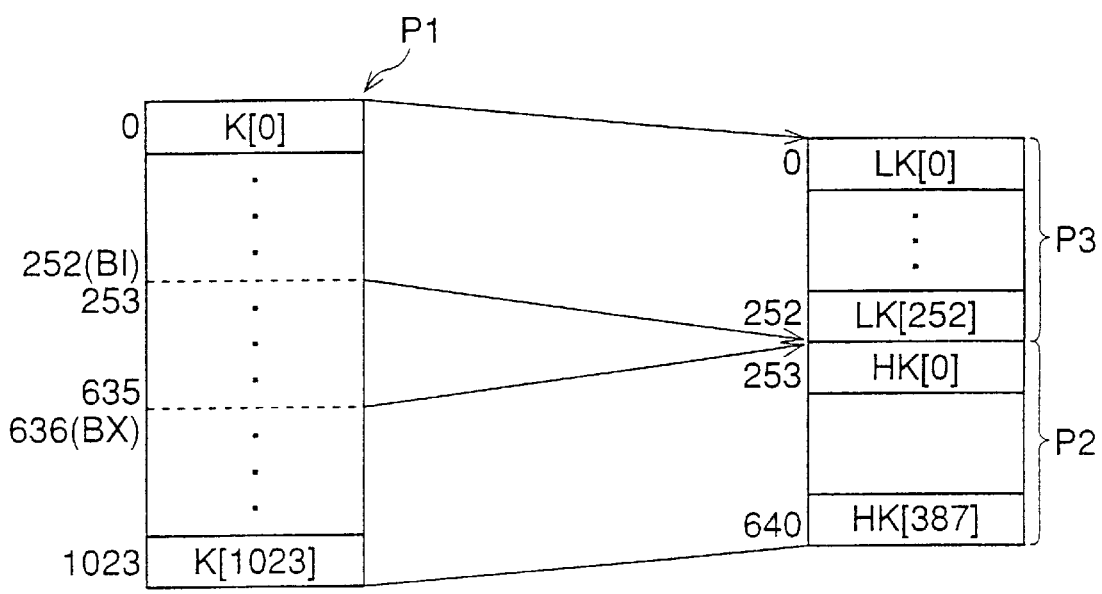
FIG. 12 is a view showing an example of a memory map of a histogram.

FIG. 12 shows an example of a memory map of the histogram H1 in the embodiment and a comparison example. In this example, a 10 bit gradation of the input pixel data is utilized.

In the comparison example, in which a conventional histogram is generated using all of the pixel data, as shown by the reference P1, the frequencies K[0] through K[1023] are stored in the addresses (0) through (1023) Conversely, in the embodiment, the frequencies HK[0] through HK[387] forming an upper histogram over the region P2 are stored in the addresses (253) through (640). Namely, the frequency HK[387] of the maximum value MX(=1023) is stored in the address (640), and the frequency HK[0] of the first boundary value BX is stored in the address (253). In the addresses (0) through (252), the frequencies LK[0] through LK[252] forming a lower histogram over the region P3 are stored. Namely, the frequency LK[0] of the minimum value MI(=0) is stored in the address (0), and the frequency LK[252] of the second boundary value BI is stored in the address (252).

Thus in the embodiment, the data, which are related to the histogram of the pixel data from the maximum value MX through the first boundary value BX, and the data, which are related to the histogram of the pixel data from the second boundary value BI through the minimum value MI, are stored in the addresses [0] through [640] which are sequential.

Figure 13:
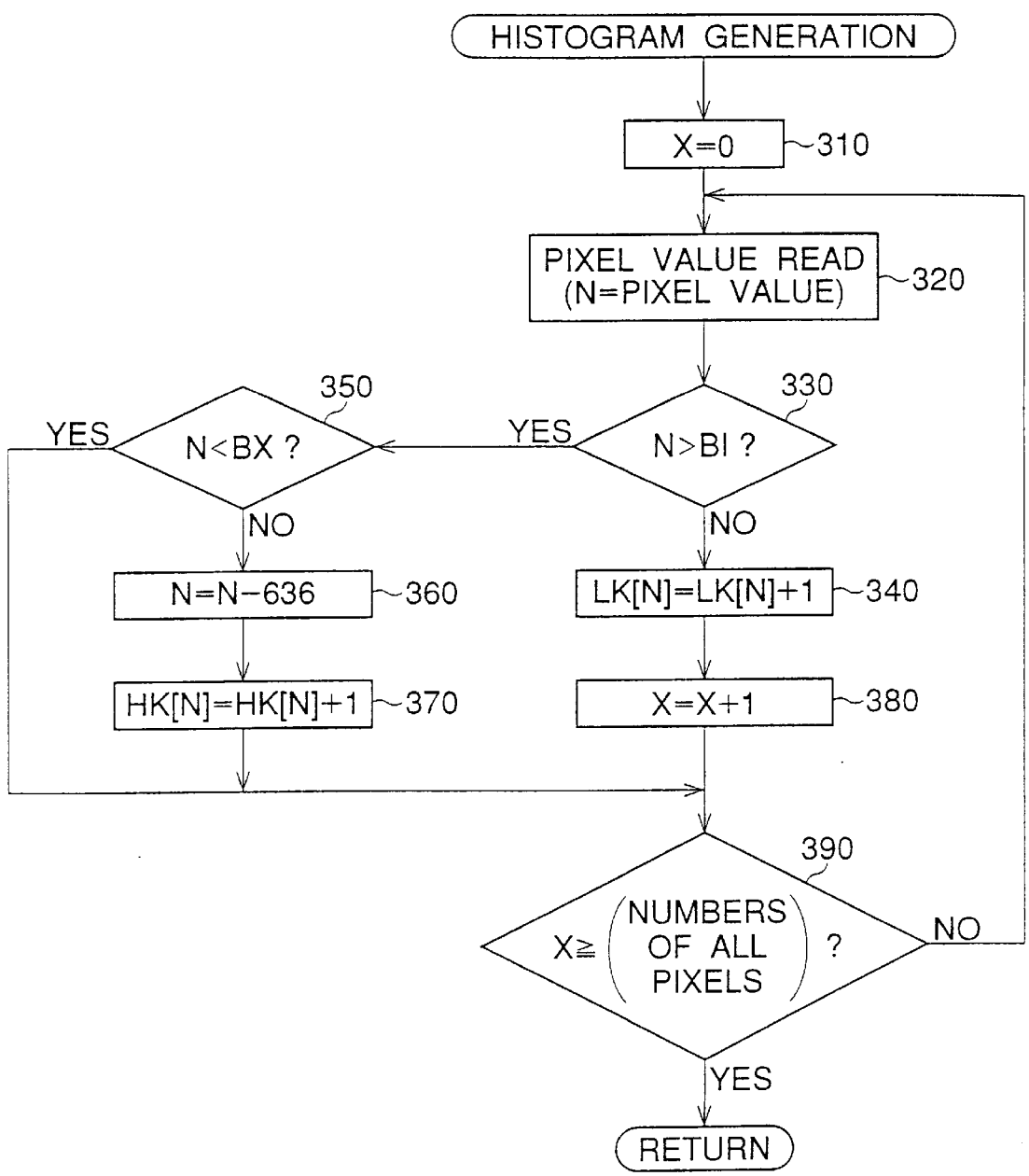
FIG. 13 is a flowchart of a subroutine by which the histogram of FIG. 12 is generated.

FIG. 13 shows a flowchart of a subroutine by which each histogram of the R, G and B components, corresponding to the regions P2 and P3 of the histogram H1 of FIG. 5, is generated. By executing the subroutine once, the histogram corresponding to a single line of digital pixel data is generated. Note that, in this example, the maximum value MX is 1023, the first boundary value BX is 636, the second boundary value BI is 252, and the minimum value MI Is 0.

In Step 310, the initial value of the parameter X is set to 0. The parameter X corresponds to a position of each of the photodiodes arranged in the longitudinal direction of the line sensor 30, and the initial value 0 implies the position of the pixel on an edge of a line.

In Step 320, a pixel value N, corresponding to parameter X, is read from the memory 46. In Step 330, it is determined whether the pixel value N is greater than the second boundary value BI (=252). When the pixel value N is leas than or equal to the second boundary value BI, namely when the pixel value N corresponds to the lower histogram P3, the frequency LK [N] of the pixel value is counted in Step 340. Namely, by the execution of Step 340, the lower histogram P3 is generated, and the process goes to Step 380, in which the parameter x is increased by 1. Then, the process goes to Step 390.

Conversely, when it is determined in Step 330 that the pixel value N is greater than the second boundary value BI, Step 350 is executed in which it is determined whether the pixel value N is less than the first boundary value BX (=636). When the pixel value N is greater than or equal to the first boundary value BX, namely when the pixel value N corresponds to the upper histogram P2, Step 360 is executed in which the first boundary value BX (=636) is subtracted from the pixel value N, and then Step 370 is executed in which the frequency HK[N] of the pixel value is counted. For example, when the pixel value is 1023, the frequency HK[387] is counted. Namely, due to Step 370, the upper histogram P2 is generated, and the process goes to Step 390.

When it is determined in Step 350 that the pixel value N is less than the first boundary value BX, namely when the pixel value N has a value from 253 through 635, since the pixel value N is not included in the upper histogram P2 nor the lower histogram P3, Steps 340, 360 and 370 are skipped, and thus, the process goes to Step 390.

In Step 390, it is determined whether the parameter X is greater than or equal to the number of all of the pixels included in one scanning line of the line sensor 30. When the parameter X is less than the number of all of the pixels, the process goes back to Step 320, so that the operations described above are repeated.

When it is determined in Step 390 that the parameter X reaches the number of all of the pixels, namely when the upper and lower histograms P2 and P3 have been generated in accordance with all of the pixel values contained in a single line of digital pixel data of a color component, this subroutine ends.

Figure 14:
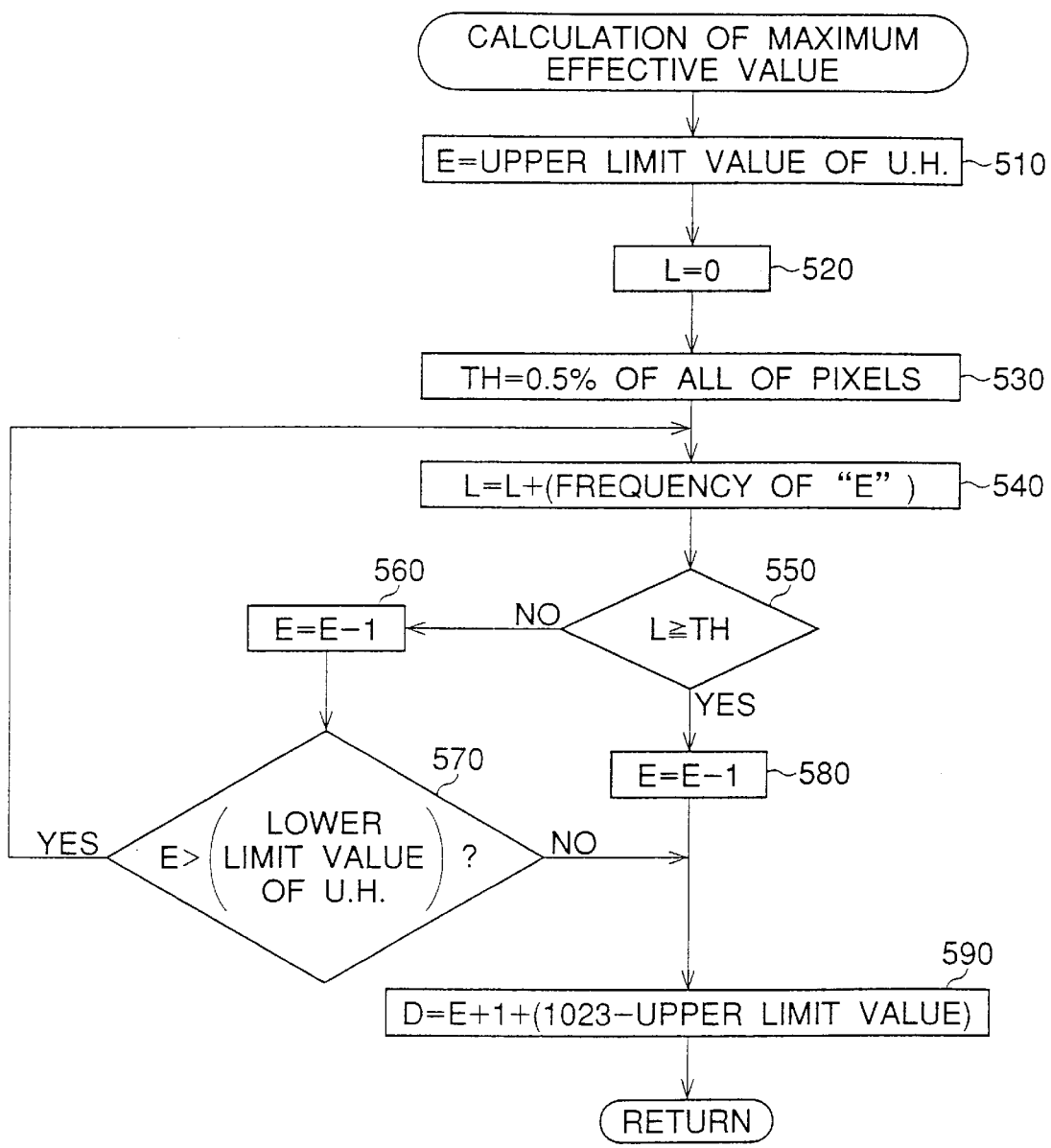
FIG. 14 is a flowchart of a subroutine by which the maximum effective value of the histogram shown in FIG. 5 is obtained.

FIG. 14 shows a flowchart of a subroutine, which is executed in Step 130 of FIG. 4, to obtain the maximum effective value "D". The maximum effective value "D" is obtained from the upper histogram P2.

In Step 510, as the initial value of the maximum effective value "D", a pixel value "E" is set to an upper limit value ULV of the upper histogram P2, which is 640 in the example shown in FIG. 12. In Step 520, a total amount "L" of the frequencies is set to an initial value 0. In Step 530, the threshold value TH is set as the 0.5% of digital pixel signals, from the total number of the digital pixel signals included in one frame, with the highest image signal levels. The maximum effective value "D" is determined in accordance with the threshold value TH. Namely, the maximum effective value "D" in the pixel value when the total amount "L" of the frequencies reaches the threshold value TH.

In Step 540, based on the upper histogram P2, the total amount "L" of the frequencies is obtained. Namely, the frequency HK[397] is read from the address (640) of the memory shown in FIG. 12, and is added to the total amount "L" of the frequencies. In Step 550, it is determined whether the total amount "L" is greater than or equal to the threshold value TH. When the total amount "L" is less than the threshold value TH, the pixel value "E" is decreased by 1 in Step 560. Then, in Step 570, it is determined whether the pixel value "E" is greater than the lower limit value of the upper histogram P2. The lower limit value is 253 in the example shown in FIG. 12. When the pixel value "E" is greater than the lower limit value of the upper histogram P2, namely when the pixel value "E" is included in the upper histogram P2, Step 540 is executed again, so that the total amount "L" of the frequencies, which are from the upper limit value 640 of the upper histogram P2 to the pixel value "E", in obtained.

Thus, when it is determined in Step 550 that the total amount "L" is greater than or equal to the threshold value TH, the pixel value "E" is decreased by 1 in Step 580, and then Step 590 is executed. When it is determined in Step 570 that the pixel value "E" is less than or equal to the lower limit value of the upper histogram P2, Step 590 is executed. In Step 590, the maximum effective value "D" is obtained according to formula (5):

$$D=E+1+(1023-ULV) \tag{5}$$

wherein "ULV" is the upper limit value of the upper histogram P2. Namely, according to formula (5), the pixel value "E" is converted to the maximum effective value "D" of the hypothetical histogram utilized in the pre-scanning operation and the regular scanning operation of FIG. 4, and corresponding to the representative histogram H1 in FIG. 5, in which the pixel data, in a range from the first boundary value BX through the second boundary value BI, are not omitted.

Figure 15:
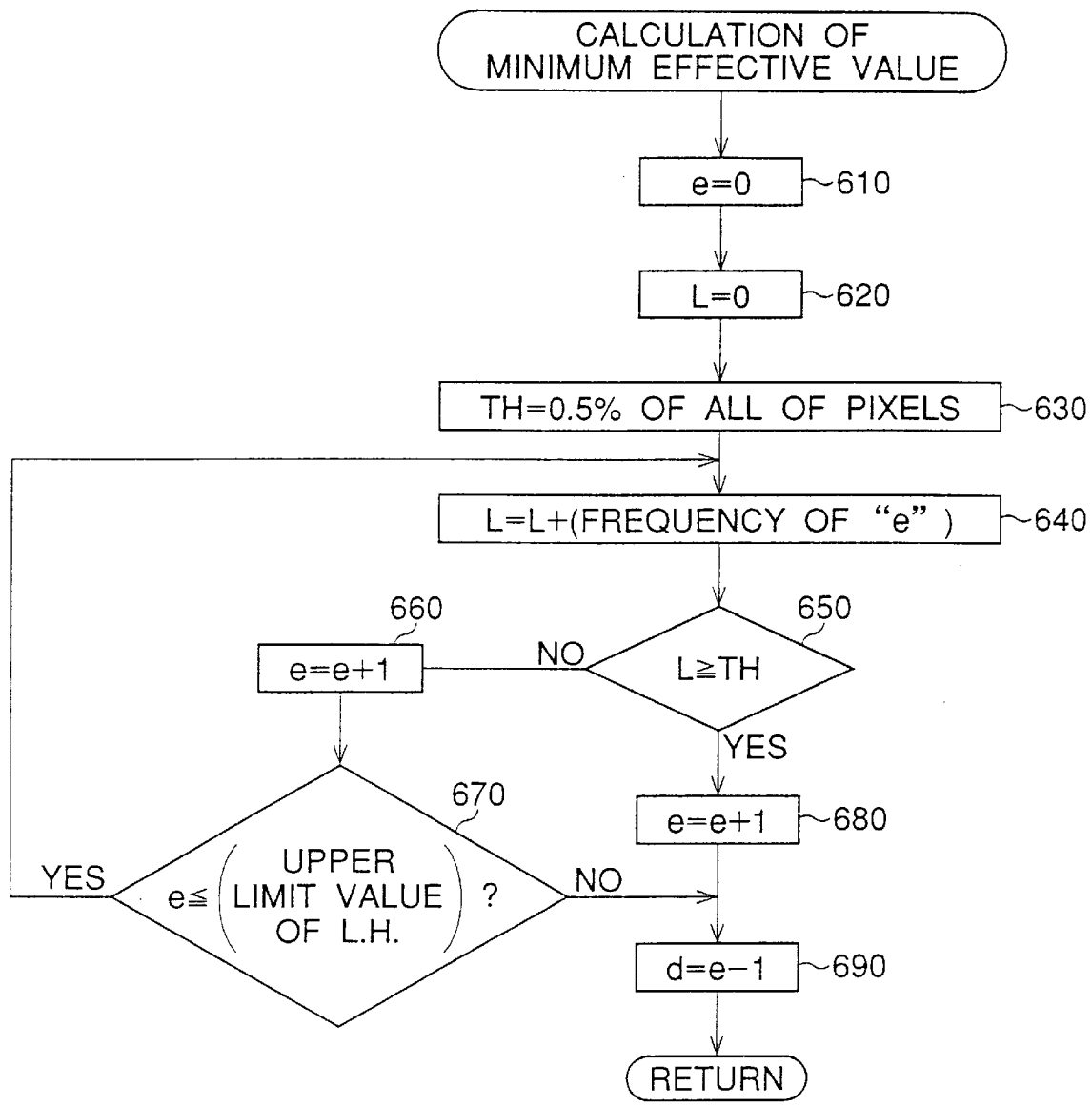
FIG. 15 is a flowchart of a subroutine by which the minimum effective value of the histogram shown in FIG. 5 is obtained.

FIG. 15 shows a flowchart of a subroutine which is executed in Step 133 shown in FIG. 4 to obtain the minimum effective value "d". The minimum affective value "d" is obtained from the lower histogram P3 of FIG. 5.

In Step 610, as the initial value of the minimum effective value "d", a pixel value "e" is set to 0. In Step 620, the total amount "L" of the frequencies is set to the initial value 0. In Step 630, the threshold value TH is set as the 0.5% of digital pixel signals, from the total number of the digital pixel signals included in one frame, with the lowest image signal levels. The minimum effective value "d" is determined in accordance with the threshold value TH. Namely, the minimum effective value "d" in the pixel value when the total amount "L" of the frequencies reaches the threshold value TH.

In Step 640, based on the lower histogram P3, the total amount "L" of the frequencies is obtained. Namely, the frequency HK[0] of the lower limit value is read from the address (0) of the memory shown in FIG. 12, and is added to the total amount "L". In Step 650, it is determined whether the total amount "L" is greater than or equal to the threshold value TH. When the total amount "L" is less than the threshold value TH, the pixel value "e" is increased by 1 in Step 660. Then, in Step 670, it is determined whether the pixel value "e" is less than the upper limit value of the lower histogram P3. The upper limit value is 253 in the example shown in FIG. 12. When the pixel value "e" is less than the upper limit value of the lower histogram P3, namely when the pixel value "e" is included in the lower histogram P3, Step 640 is executed again, so that the total amount "L" of the frequencies, which are from the lower limit value 0 of the lower histogram P3 to the pixel value "e" is obtained.

Thus, when it is determined in Step 650 that the total amount "L" of the frequencies is greater than or equal to the threshold value TH, the pixel value "e" is increased by 1 in Step 680, and then Step 690 is executed. When it is determined in Step 670 that the pixel value "e" is less than the lower limit value of the lower histogram P3, Step 690 is executed, in which 1 is subtracted from the pixel value "e", and thus the minimum effective value "d" is obtained.

As described above, according to the embodiment, histogram data for providing a complete-data histogram corresponding to the complete-data histogram H1 of FIG. 5 need not be stored in the memory 46, but only histogram data, which are used in a process such as the obtaining of the color correction parameters, are stored in the memory 46. Therefore, the memory capacity necessary for storing the histograms is reduced.

Figure 17:
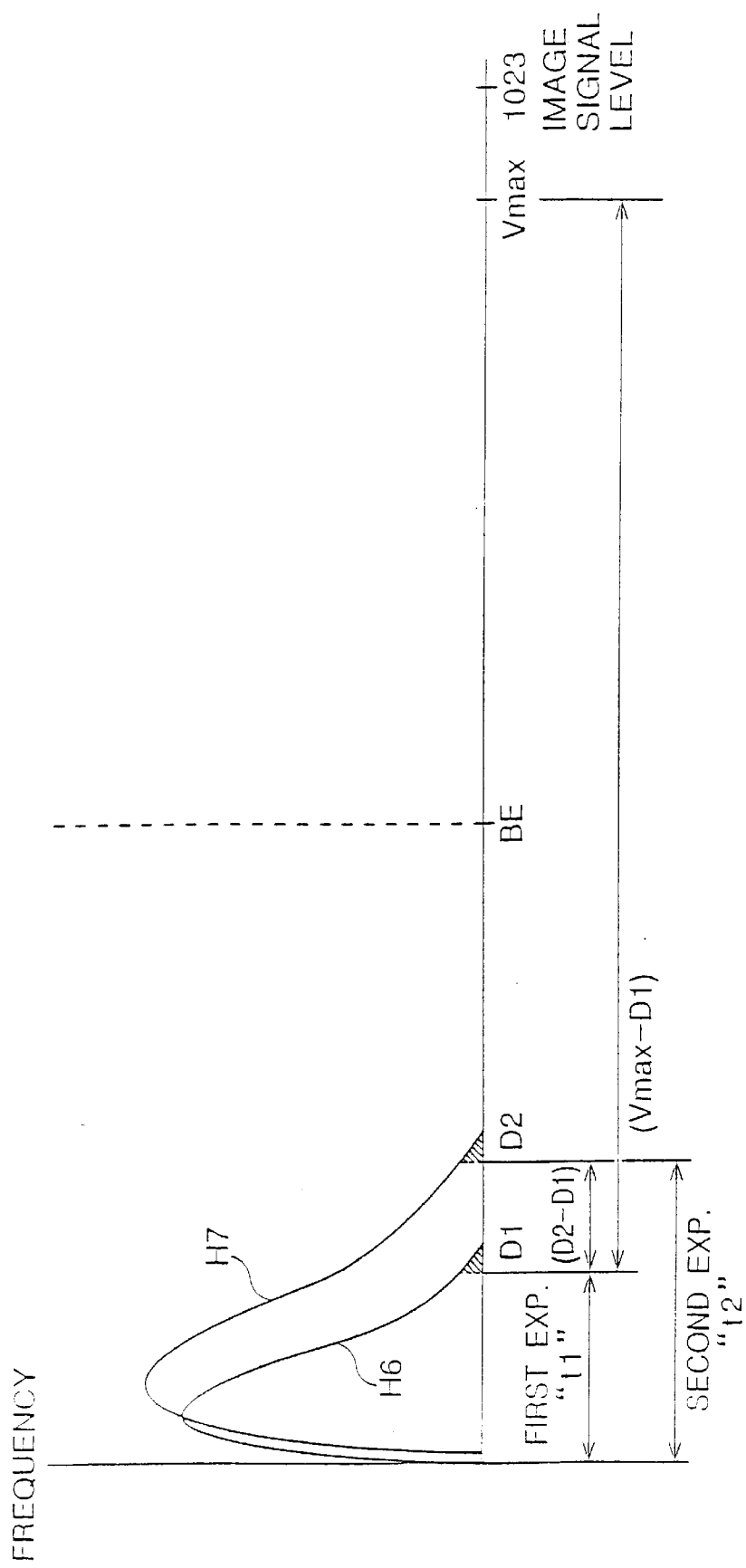
FIG. 17 are histograms obtained by the exposure measurement shown in FIGS. 16A and 16B.

In the embodiment described above, although the histogram is used for calculating the color correction parameters for each color component, the present invention can be utilized in an exposure measurement, which is executed in Step 110 of FIG. 4. In the exposure measurement, the exposure time of the line sensor 30 is very short in comparison with the pre-scanning operation and the regular scanning operation. Thus, as shown in FIG. 17, histograms are generated, which relate only to the pixel values which are less than a third boundary value BE. Namely, the subroutine of FIG. 13 for generating the histogram is changed in such a manner that Steps 350, 360 and 370 are omitted and it is determined in Step 330 whether the pixel value is less than the third boundary value BE. Note that the third boundary value BE is approximately half of the upper standard value Vmax, for example. A process of the exposure measurement is described below.

Figure 16A:
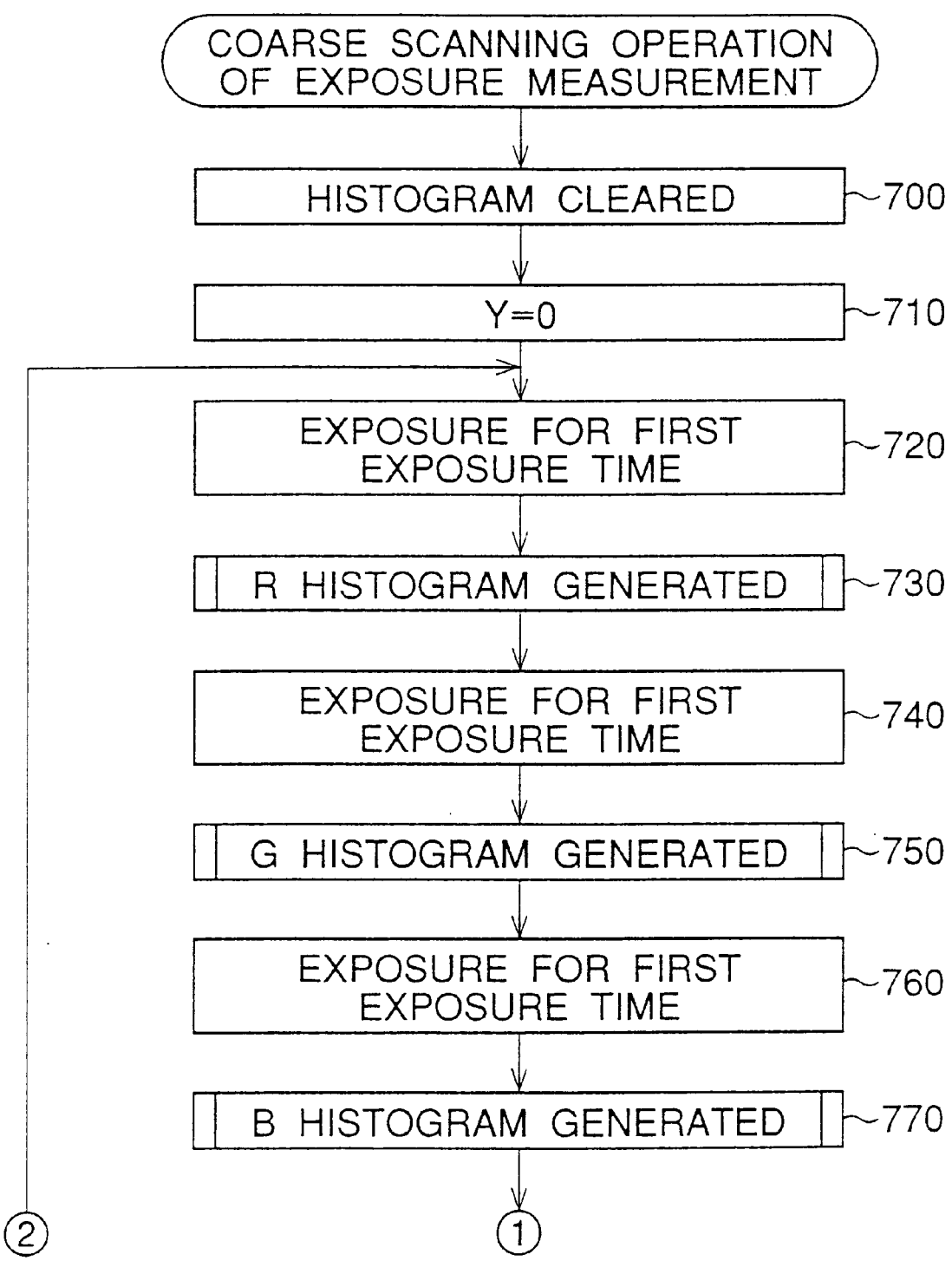
FIG. 16A is the first part of a flowchart of a subroutine in which an exposure measurement is carried out.
Figure 16B:
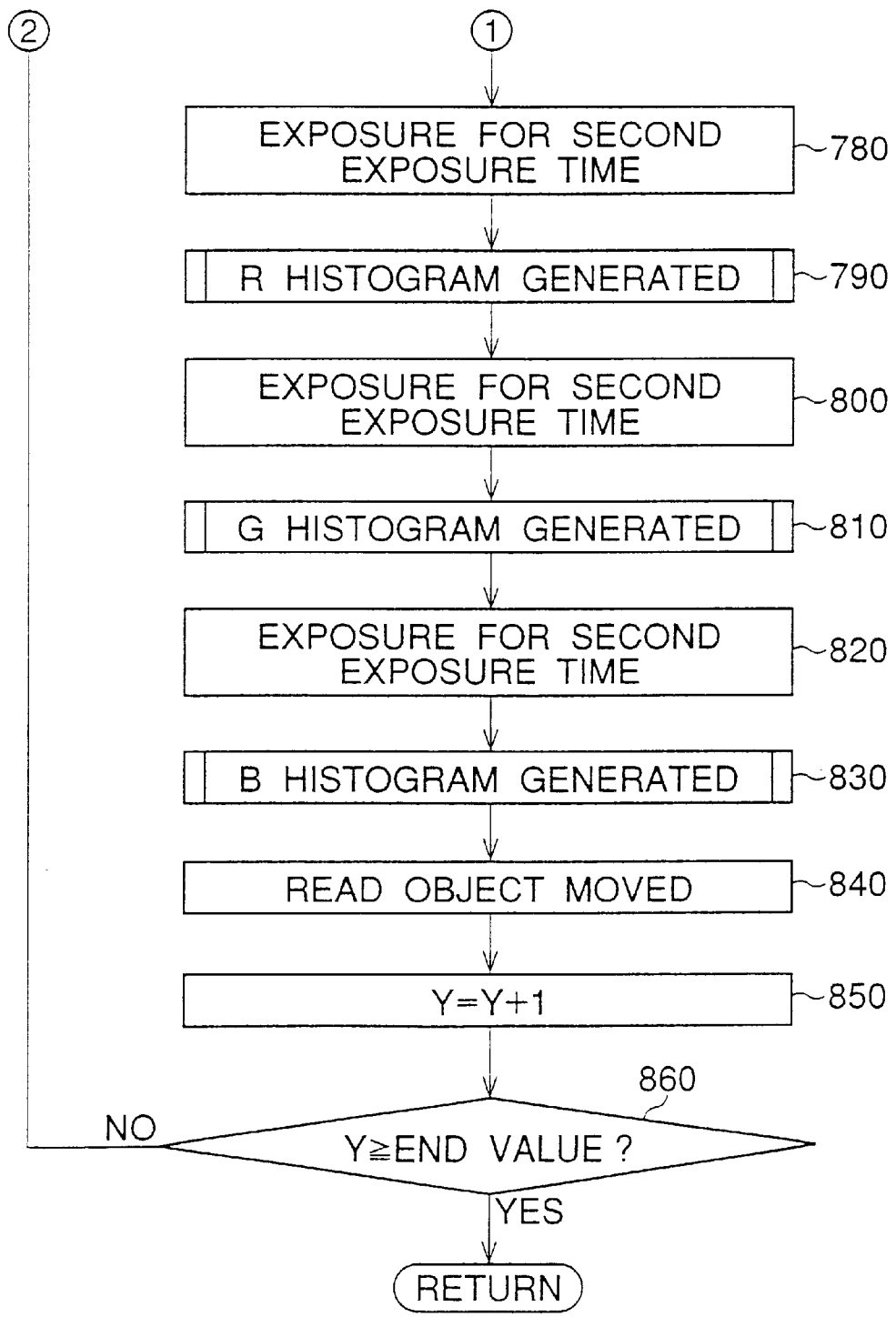
FIG. 16B is the remaining part of the flowchart shown in FIG. 16A.

FIGS. 16A and 16B show a flowchart of a subroutine in which a coarse scanning operation of the exposure measurement is carried out, wherein the histogram in generated for each of the R, G and B components.

In Step 700, histogram data, which are stored in the memory 46, are cleared. In Step 710, the stage 12 is moved, so that an edge portion of the read object M is set to an initial position corresponding to the light source 20, and an initial value of a parameter Y corresponding to the position of the read object M is set to 0.

In Step 720, the light-emitting diodes 21R of the light source 20 are turned ON, so that the read object M is illuminated. The line sensor 30 is exposed for a first exposure time for the R component, by a red light beam passing through the read object M, whereby a single line of red pixel data are detected. The single line of red pixel data are converted to a single line of digital red pixel data by the A/D convertor 44 and stored in the memory 46. In Step 730, a subroutine for generating a histogram is executed, in a similar way as Step 230 shown in FIG. 11, so that a histogram of the R component is generated.

Similar to the R component, in Step 740, the light-emitting diodes 21G of the light source 20 are turned ON, and thus the line sensor 30 is exposed for a first exposure time to the G component. In Step 750, a histogram of the G component is generated. In Step 760, the light-emitting diodes 21B of the light source 20 are turned ON, and thus the line sensor 30 is exposed for a first exposure time to the B component. In Step 770, a histogram of the B component is generated.

Thus, regarding each of the R, G and B components, the respective histograms are generated in accordance with a single line of digital pixel data, using the first exposure time.

Then, in Steps 780 through 830, a histogram is generated for each of the color components, using a second exposure time, in a similar way to the process using the first exposure time. A second exposure time for the R component, a second exposure time for the G component, and a second exposure time for the B component are set based on input/output characteristics of the line sensor 30 and an input range of the A/D convertor, respectively. The second exposure times are set to be longer than the first exposure time.

The contents of Steps 780 through 830 are basically the same as those of Steps 720 through 770.

In Step 840, the stage 12 and the read object M are moved by one pitch, and in Step 850, the parameter Y is increased by one. In Step 860, it is determined whether the parameter Y is greater than or equal to the end value (i.e. the number of scanning lines of the coarse scanning operation). When the parameter Y is less than the end value, the processes from Steps 720 through 860 are executed again, so that the histograms including the next lines are generated for the R, G and B components. When it in determined in Step 860 that the parameter Y is greater than or equal to the end value, the subroutine of the coarse scanning operation ends since the respective histograms of one frame image have been completed. Note that, in FIG. 17, reference H6 indicates a representative histogram obtained by the first exposure time, and reference H7 indicates a representative histogram obtained by the second exposure time.

Then, a program, which is similar to the subroutine for calculating the maximum effective value "D", as shown in FIG. 14, is executed, so that maximum effective values "D1" and "D2" of the histograms which are obtained by the first and second exposure times, are calculated for the R, G and B components, respectively.

The optimum exposure time T is obtained by the following formula (4):

$$T=(Vmax-D1)/(D2-D1)\times(t2-t1)+t1 \quad (4)$$

In FIG. 17, the histogram H6 corresponds to the pixel data which are obtained by exposure using the first exposure time "t1", and the histogram H7 corresponds to the pixel data which are obtained by exposure using the second exposure time "t2". The upper standard value Vmax is a proper output value of the line sensor 30, and is determined mainly in accordance with the input range of the A/D convertor 44.

In a relationship between the output of the A/D convertor 44 to the amount of light incident on the line sensor 30, the output signal of the A/D convertor 44 possesses a nonlinear characteristic over a range in which the amount of incident light is relatively small. Therefore, the optimum exposure time is calculated by taking account of the input/output characteristics of the line sensor 30 and the amplifier 43, in such a manner that the influence of the nonlinearity is removed as much as possible.

Namely, the input/output characteristics of the line sensor 30 and the amplifier 43 are nonlinear for the first exposure time "t1". Conversely, the input/output characteristics of the line sensor 30 and the amplifier 43 are approximately linear for an exposure time which is longer than the first exposure time, i.e. in a range (Vmax−D1) of the pixel values which are output signals of the line sensor 30, and thus the output of the line sensor 30 is approximately proportional to the exposure time (t2−t1). Therefore, by multiplying the exposure time (t2−t1) by the proportional coefficient (Vmax−D1)/(D2−D1), the output range of the line sensor 30 is expanded from (D2−D1) to (Vmax−D1), and then, by adding the first exposure time "t1" to the multiplication result, the optimum exposure time T is obtained.

Thus, according to formula (4), since the proportional coefficient, which is obtained from the histograms in a range in which the input/output characteristics of the line sensor 30 and the analog process circuit are approximately linear, is used, the optimum exposure time is calculated with a higher accuracy.

As described above, also in the exposure measurement, by generating the histograms, using data having values lower than the third boundary value BE, the memory capacity for storing the histograms in reduced.

The ranges of the pixel data (abscissa) of the histograms H6 and H7 in the exposure measurement, are not necessarily the same as the range in the calculation of the color correction. Namely, usually, the third boundary value in the exposure measurement is different from each of the first and second boundary values in the color correction calculation.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-184477 (filed on Jun. 25, 1997) which is expressly incorporated herein, by reference, in its entirety.

What is claimed is:

1. An image reading device, comprising:
   a pixel data reading processor that reads pixel data forming an image, each of said pixel data having a value included in a first range;
   a histogram generating processor that generates a histogram representing a distribution of said pixel data having values included only in a second range which is a part of said first range, said histogram generating processor generates said histogram based on pixel data of said second range which are included in an upper portion, from a maximum value of said first range to a first boundary value which is lower than said maximum value, and a lower portion, from a minimum value of said first range to a second boundary value which is lower than said first boundary value and higher than said minimum value; and
   a data storage processor that stores data related to said histogram generated by said histogram generating processor, said data storing processor stores first data, related to said upper portion of said pixel data and second data, related to said lower portion of said pixel data, in successive addresses of a memory.

2. A device according to claim 1, wherein said second range comprises an upper range from a maximum value of said first range to a first boundary value which is lower than said maximum value, and a lower range from a minimum value of said first range to a second boundary value which is lower than said first boundary value and higher than said minimum value.

3. A device according to claim 1, wherein said second range is from a third value, which is lower than said maximum value of said first range, to said minimum value of said first range.

4. A device according to claim 1, wherein said pixel data reading processor comprises an optical sensor sensing said image, and said histogram is used for performing an exposure measurement, in which an optimum exposure time of said optical sensor is obtained, and a color correction parameter calculation, in which a color correction parameter is obtained to perform a color correction to pixel data outputted from said optical sensor.

5. A device according to claim 4, wherein said second range is different in said exposure measurement and said color correction parameter calculation.

6. An image reading device, comprising:
   a pixel data reading processor that reads pixel data forming an image;
   a histogram generating processor that generates a histogram representing a distribution of only a part of said pixel data read by said pixel data reading processor, said histogram generating processor generates said histogram based on pixel data which are included in an upper range from a maximum value of said image forming pixel data to a first boundary value which is lower than said maximum value, and a lower range from a minimum value of said image forming pixel data to a second boundary value which is lower than said first boundary value and higher than said minimum value,
   a data storing processor that stores data related to said histogram generated by said histogram generating processor, said data storing processor stores first data, related to said upper range of said pixel data and second data, related to said lower range of said pixel data in successive addresses of a memory.

7. An image reading device, comprising:
   means for reading pixel data which forms an image, each of said pixel data having a value included in a first range;
   means for generating a histogram representing a distribution of said pixel data having values included only in a second range which is part of said first range, said histogram generating means generating said histogram based on pixel data of said second range which are included in an upper portion, from a maximum value of said first range to a first boundary value which is lower than said maximum value, and in a lower portion, from a minimum value of said first range to a second boundary value which is lower than said first boundary value and higher than said minimum value; and
   means for storing data related to said histogram generated by said histogram generating means, said data storing means stores first data, related to said upper portion and second data, related to said lower portion in successive addresses of a memory.

8. A device according to claim 1, said pixel reading processor comprising an optical sensor and controlling an exposure time of the optical sensor based on the histogram generated by the histogram generating processor.

9. A device according to claim 6, said pixel data reading processor comprising an optical sensor and controlling an the exposure time of the optical sensor based on the histogram generated by the histogram generating processor.

10. A device according to claim 7, said pixel data reading means having an optical sensor and controlling and exposure time of the optical sensor based on the histogram generated by the histogram generating means.

* * * * *